United States Patent [19]

Hayami

[11] Patent Number: 5,380,024
[45] Date of Patent: Jan. 10, 1995

[54] DOUBLE WISHBONE TYPE SUSPENSION HAVING A-TYPE ARM COMBINED WITH PIVOTED EXPANSIBLE/CONTRACTIBLE CONNECTION LINK AND LATERAL LINK

[75] Inventor: Hiroshi Hayami, Toyota, Japan

[73] Assignee: Toyota Jidosha Kabushiki Kaisha, Aichi, Japan

[21] Appl. No.: 249,932

[22] Filed: May 26, 1994

[30] Foreign Application Priority Data

Jun. 7, 1993 [JP] Japan .................. 5-163122

[51] Int. Cl.⁶ .................................................. B60G 3/00
[52] U.S. Cl. ............................... 280/96.1; 280/675; 280/691; 280/673
[58] Field of Search ............. 280/660, 96.1, 675, 280/673, 688, 691

[56] References Cited

U.S. PATENT DOCUMENTS

| | | | |
|---|---|---|---|
| 4,706,989 | 11/1987 | Iijimi et al. ............ | 280/675 X |
| 5,098,118 | 3/1992 | Hayadi ................. | 280/691 |
| 5,205,580 | 4/1993 | Lager et al. ........... | 280/675 |

FOREIGN PATENT DOCUMENTS

| | | | |
|---|---|---|---|
| 3900336 | 7/1990 | Germany .............. | 280/675 |
| 2-136211 | 5/1990 | Japan . | |

Primary Examiner—Kenneth R. Rice
Assistant Examiner—Christopher P. Ellis
Attorney, Agent, or Firm—Oliff & Berridge

[57] ABSTRACT

A double wishbone type suspension for suspending a carrier 10 for supporting a vehicle wheel 12 to be rotatable about an axis of rotation 12A is constructed by an upper arm 14 extending substantially in a lateral direction of a vehicle between its inboard end 18 pivotably connected with a vehicle body 20 and its outboard end 22 pivotably connected with a first portion 22 of the carrier, a lower arm 16 having at least two inboard ends 24, 26 spaced apart from one another in a longitudinal direction of the vehicle and pivotably connected with the vehicle body and an outboard end 30 pivotably connected with a second portion 20 of the carrier, a longitudinally expansible/contractible connection link 36 having one end 38 connected with a portion 38 of the lower arm substantially distant from the outboard end 30 thereof to be pivotable relative thereto about a substantially vertical axis 40 and another end 42 pivotably connected with a third portion 42 of the carrier substantially distant from the second portion 30 thereof, and a lateral link 60 having an inboard end 56 pivotably connected with the vehicle body and an outboard end 58 pivotably connected with either a portion 54 of the carrier substantially distant from the second portion 30 thereof in at least the longitudinal direction of the vehicle or the second end 42 of the connection link.

9 Claims, 3 Drawing Sheets

DOUBLE WISHBONE TYPE SUSPENSION HAVING A-TYPE ARM COMBINED WITH PIVOTED EXPANSIBLE/CONTRACTIBLE CONNECTION LINK AND LATERAL LINK

BACKGROUND OF THE INVENTION

1. Field of the Invention

The present invention relates to a suspension of a vehicle such as an automobile, and more particularly to a double wishbone type suspension.

2. Description of the Prior Art

As a type of suspension of a vehicle such as an automobile, there has been conventionally known a suspension comprising a carrier for rotatably supporting a vehicle wheel, and a so-called H-type arm having two inboard ends spaced from one another in a substantially longitudinal direction of the vehicle and pivotably connected with the body of the vehicle via elastic bushings and two outboard ends spaced from one another in a substantially longitudinal direction of the vehicle and pivotably connected with the carrier, as shown in, for example, Japanese Patent Laid-open Publication 2-136311.

FIG. 5 is a perspective view showing an example of the above-mentioned type suspension in skeleton, wherein the suspension is constructed as a double wishbone type rear suspension for a vehicle wheel. In FIG. 5, a shock absorber and a suspension spring are omitted for the clarity of the illustration. In this FIG. 10 is a carrier for supporting a vehicle wheel 12 to be rotatable about an axis of rotation 12A. 14 and 16 are upper and lower arms, respectively. In the shown embodiment, the lower arm 16 is an H-type arm, while the upper arm 14 is an I-type arm.

The upper arm 14 extends substantially in a lateral direction of the vehicle, with its inboard end being pivotably connected with a vehicle body 20 via a joint 18 including a rubber bushing, while its outboard end is pivotably connected with the carrier 10 via a ball joint 22. The lower arm 16 has two inboard ends spaced from one another in a longitudinal direction of the vehicle, the two inboard ends being connected with the vehicle body 20 via a pair of joints 24 and 26 each including a rubber bushing to be pivotable about a common axis 28, and two outboard ends spaced from one another in a substantially longitudinal direction of the vehicle, the two outboard ends being pivotably connected with the carrier 10 via a pair of ball joints 30 and 32 to be pivotable about a common axis 34.

In such a suspension, the carrier 10 is supported more stably by the lower arm 16 pivotably connected therewith on the outboard side thereof at two positions spaced from one another in a substantially longitudinal direction of the vehicle, the lower arm being pivotably connected with the vehicle body 20 on its inboard sides at two positions spaced from one another in a substantially longitudinal direction of the vehicle, than in a double wishbone type suspension composed of a plurality of I-type arms.

However, in the above-mentioned type suspension employing an H-type arm having two outboard ends pivotably connected with the carrier, the carrier can be turned neither forward nor rearward relative to the suspension arm, and therefore this type of suspension is not employable for a rear suspension of a vehicle in which four vehicle wheels are steered.

SUMMARY OF THE INVENTION

In view of the above-mentioned problem in the suspension employing the conventional H-type arm, it is an object of the present invention to provide an improved suspension which provides a stable suspension for a vehicle wheel and is still applicable to the rear suspension of a vehicle in which four vehicle wheels are steered.

According to the present invention, the above-mentioned object is accomplished by a double wishbone type suspension comprising a carrier for supporting a vehicle wheel to be rotatable about an axis of rotation, an upper arm extending substantially in a lateral direction of a vehicle to have an inboard end pivotably connected with a body of the vehicle and an outboard end pivotably connected with a first portion of said carrier, a lower arm having at least two inboard ends spaced apart from one another in a longitudinal direction of the vehicle and pivotably connected with the body of the vehicle and an outboard end pivotably connected with a second portion of said carrier, a longitudinally expansible/contractible connection link having a first end connected with a portion of said lower arm substantially distant from said outboard end thereof to be pivotable relative thereto about a substantially vertical axis and a second end opposite to said first end pivotably connected with a third portion of said carrier substantially distant from said second portion thereof, and a lateral link having an inboard end pivotably connected with the body of the vehicle and an outboard end pivotably connected with either a portion of said carrier substantially distant from said second portion thereof in at least the longitudinal direction of the vehicle or said second end of said connection link.

According to the above-mentioned construction, the lower arm construction is provided by a combination of the substantially A-type lower arm and the longitudinally expansible/contractible connection link pivotably connected with the lower arm so as to modify the outboard end thereof into a bifurcated construction so that an H-type lower arm construction is provided, wherein, however, the bifurcated outboard end has such a flexibility that allows the carrier pivotably connected therewith to make a steering turn under an expansion or a contraction of the connection link.

By such a construction that the lengthwise expansible/contractible connection link is pivotably connected with the lower arm to be pivotable about the substantially vertical axis, the bifurcated outboard end of the lower arm construction can exhibit a substantial rigidity against a twisting force applied thereto so that the carrier can be supported more stably against rotation than being supported by a simple A-type lower arm.

The flexibility at the bifurcated outboard end of the modified H-type lower arm construction according to the present invention is adjustably supported by the lateral link. The above-mentioned flexibility is the pivotability of the connection link along a substantially horizontal phantom plane along which the lower arm of the vehicle wheel suspension is generally arranged, and is, in fact, a steerabilty of the bifurcated outboard end of the lower arm construction where the carrier is supported. Therefore, when the lateral link is provided to control the lateral component of the two dimensional turning movement of the carrier about the pivotal connection thereof with the outboard end of the A-type lower arm, or of the two dimensional turning movement of the connection link about the pivotal connection thereof with the A-type lower arm, along said substantially horizontal phantom plane, by being expanded between its inboard end pivotably connected with the vehicle body and its outboard end pivotably connected with either a portion of the carrier substantially distant from the pivotal connection of the carrier with the outboard end of the A-type lower arm in at least the longitudinal direction of the vehicle or pivotably connected with the second end of the connection link opposite to the first end thereof pivotably connected with the A-type lower arm, the turn of the carrier about the pivotal connection thereof with the outboard end of the A-type lower arm in the steering direction is definitely controlled by the lateral link, such that, when the inboard end of the lateral link is maintained stationary relative to the vehicle body, then the suspension is constructed as a non-steering suspension, while, when the inboard end of the lateral link is supported from the vehicle body to be laterally shiftable via any convenient actuator means, then the suspension is constructed as a steerable suspension.

In this case, as is described in more detail hereunder, the toe angle performance of the suspension during a braking of the vehicle can be optionally adjusted by the arrangement of the position of the inboard end of the lateral link relative to that of the outboard end thereof.

In the above-mentioned suspension according to the present invention, said second end of the connection link and said outboard end of the lateral link may be pivotably connected with the carrier by a common pivot shaft.

In this connection, the carrier may have an arm portion extending rearward from a principal body thereof to provide said third portion thereof such that the common pivot shaft is mounted at a free end portion of said arm portion providing said third portion so as to penetrate therethrough with opposite ends thereof projecting on opposite sides of said arm portion, and said second end of said connection link and said outboard end of said lateral link may be pivotably mounted to said oppositely projected portions of the common pivot shaft, respectively.

In the above-mentioned construction, a first one of the projected ends of the pivot shaft may be formed with a ball portion, and said second end of the connection link may have a socket portion for receiving the ball portion to construct a ball joint therewith.

Further, a semi-ball element may be mounted on a second one of said projected ends of said pivot shaft opposite to said first end, and said outboard end of the lateral link may have a socket portion for receiving the semi-ball element to construct a ball joint therewith.

The connection link may comprise an inner pipe element and an outer pipe element telescoped with one another.

The portion of the lower arm at which said first end of the connection link is pivotably connected may be formed with a pair of brackets, and said first end of the connection link may be mounted between the pair of brackets by a shaft element supported at opposite ends thereof by the pair of brackets.

The portion of the lower arm at which said first end of the connection link is pivotably connected may be substantially displaced inboard from the outboard end thereof pivotably connected with said second portion of the carrier, and the arm portion of the carrier may extend rearward as well as inboard from the principal body toward the free end thereof providing said third portion of the carrier.

In this case, the connection link will be readily disposed substantially along a longitudinal direction of the vehicle from said first end thereof pivotably connected with the lower arm to said second end thereof pivotably connected with the carrier as viewed from the top of the vehicle.

BRIEF DESCRIPTION OF THE DRAWINGS

In the accompanying drawings.

DESCRIPTION OF THE PREFERRED EMBODIMENT

In the following, the present invention will be described in more detail with respect to an embodiment thereof with reference to the accompanying drawings.

Figure 1:
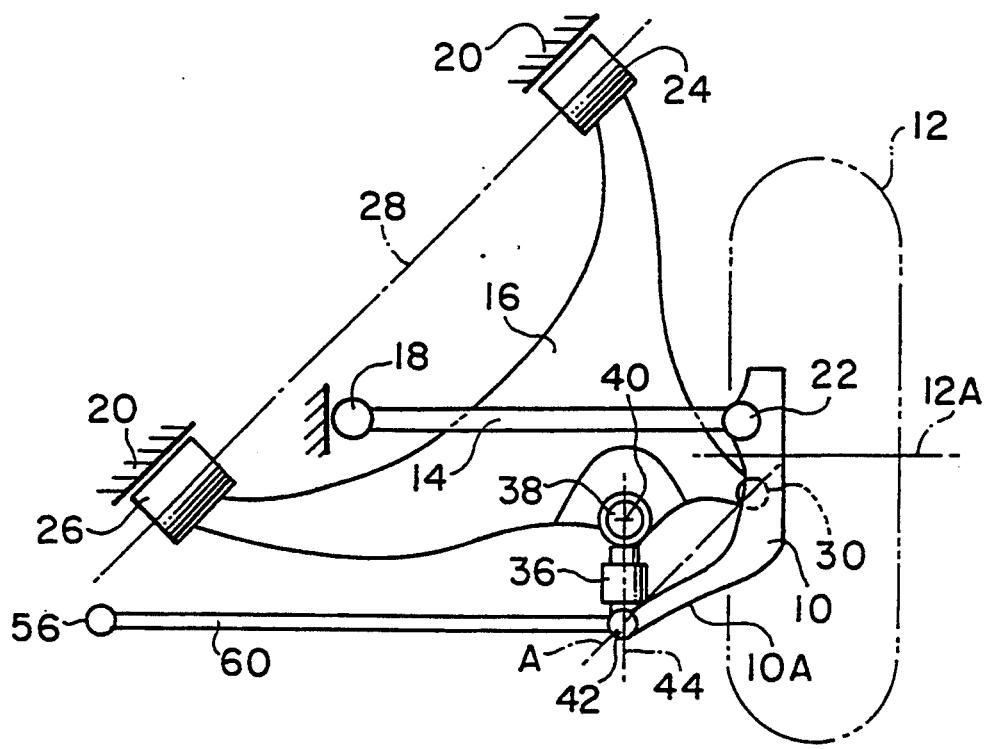
FIG. 1 is a diagrammatic plan view showing an embodiment of a double wishbone type suspension according to the present invention.
Figure 2:
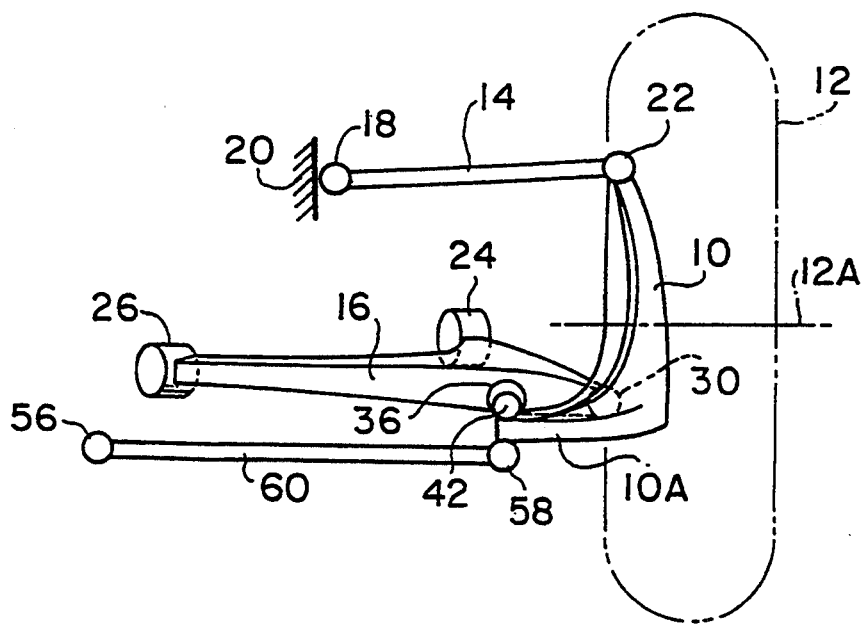
FIG. 2 is a diagrammatic rear view of the embodiment shown in FIG. 1.
Figure 5:
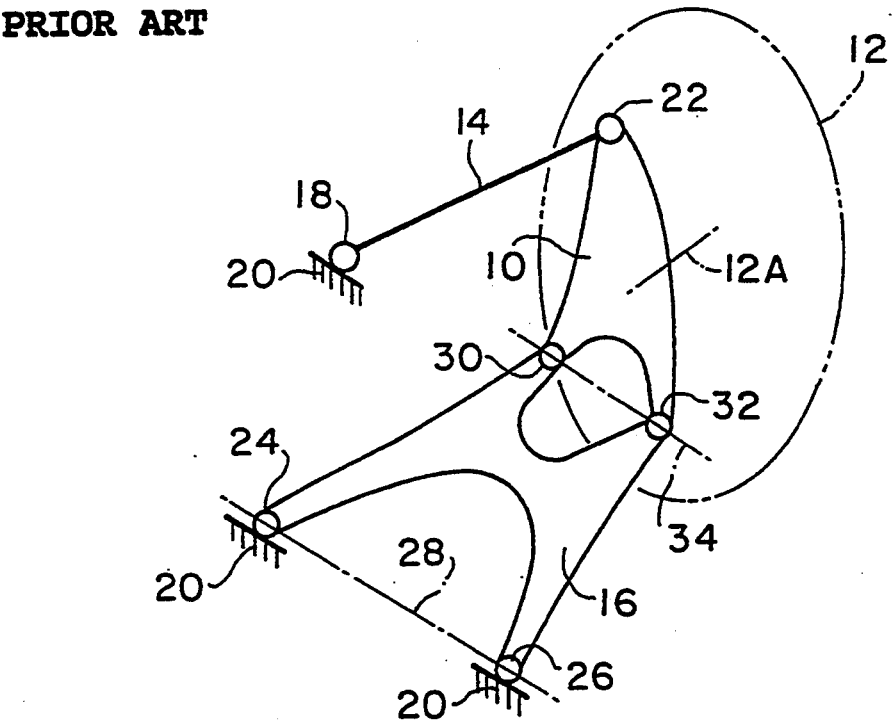
FIG. 5 is a perspective view showing a conventional double wishbone type suspension having an H-type arm in skeleton.

In FIGS. 1 and 2, the portions corresponding to those shown in FIG. 5 are designated by the same reference numerals as in FIG. 5. Further, in FIGS. 1 and 2 a shock absorber and a suspension spring are omitted for the clarity of illustration.

Referring to these FIGS. 10 is a carrier for supporting a vehicle wheel 12 to be rotatable about an axis of rotation 12A. 14 and 16 are an upper arm and a lower arm, respectively. The upper arm 14 is an I-type arm, extending substantially in a lateral direction of the vehicle, with an inboard end thereof being pivotably connected with a vehicle body 20 via a joint 18 including a rubber bushing, while an outboard end thereof is pivotably connected with the carrier 10 via a ball joint 22.

The lower arm 16 is a substantially A-type arm, having two inboard ends substantially spaced apart from one another in a longitudinal as well as lateral direction of the vehicle and pivotably connected with the vehicle body 20 via a pair of joints 24 and 26 to be pivotable about a common axis 28, and an outboard end pivotably connected with a lower end portion of the carrier 10 via a ball joint 30. Particularly in the shown embodiment, the front side joint 24 of the lower arm 16 is spaced relative to the rear side joint 26 on the front and outboard side, while the rear side joint 26 is positioned at substantially the same longitudinal position of the vehicle as the ball joint 30.

Adjacent the outboard end thereof the lower arm 16 is pivotably connected with a front end of a connection link 36 via a joint 38 such that the connection link 36 is pivotable relative to the lower arm about a substantially vertical axis 40. A rear end of the connection link 36 is pivotably connected with an end of an arm portion 10A of the carrier 10 via a ball joint 42, the arm portion 10A extending from a principal body of the carrier 10 rearward as well as inboard. In the shown embodiment, when viewed in a condition that the vehicle wheel 12 is at its neutral position, the connection link 36 extends substantially in a longitudinal direction of the vehicle and in fact substantially horizontally, with the ball joints 30 and 42 being arranged such that, as viewed in a plan view, a straight line A connecting the centers of the ball joints 30 and 42 extends substantially in parallel with the axis 28.

Figure 3:
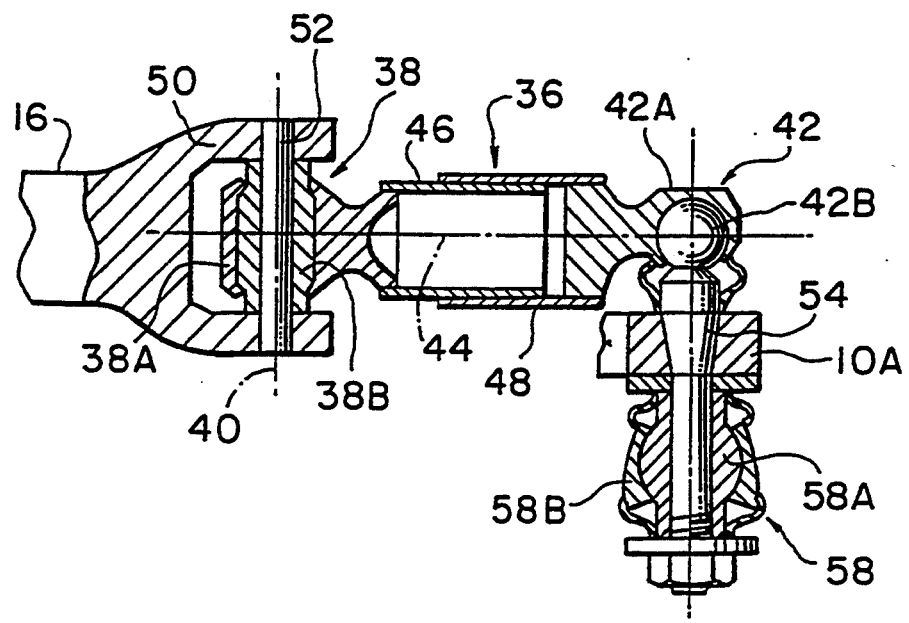
FIG. 3 is an enlarged sectional view showing the structure around the connection link in the embodiment shown in FIGS. 1 and 2.

As is shown in detail in FIG. 3, the connection link 36 in the shown embodiment comprises an inner pipe 46 and an outer pipe 48 closely telescoped to be shiftable relative to one another along an axis 44, so that the connection link 36 is optionally expansible/contractible along the axis 44 according to the relative position of the two pipe elements, while exhibiting a high rigidity and strength against a force acting in a direction perpendicular to the axis 44.

At one end of the inner pipe 46 is integrally provided a socket element 38A forming a part of the joint 38, wherein the socket element 38A is supported by a cylindrical intermediate shaft element 38B to be rotatable about the substantially vertical axis 40 relative to one another, wherein the intermediate shaft element 38B is supported by a shaft element 52 fixed at opposite ends thereof to a pair of brackets 50 formed in the lower arm 16. At one end of the outer pipe 48 is integrally provided a socket element 42A forming a part of the ball joint 42, wherein the socket element 42A receives a ball portion 42B provided at one end of a shaft 54 connected with the arm portion 10A, such that the connection link 36 is three dimensionally pivotable about the center of the ball portion 42B relative to the arm portion 10A.

Further, on the rear side of the lower arm 16 there is provided a lateral link 60 having an inboard end pivotably connected with the vehicle body 20 directly or indirectly via a joint 56 and an outboard end pivotably connected with the arm portion 10A via a joint 58. In the shown embodiment, the joint 58 is positioned beneath the ball joint 42, and comprises, as shown in FIG. 3, a semi ball element 58A fixed to the arm portion 10A by the shaft 54 and a socket element 58B integrally fixed to the outboard end of the lateral link 60 and receiving the semi ball element 58A. However, the outboard end of the lateral link 60 may be pivotably connected with a rear end portion of the arm portion 10A by a pivot means completely independent of the pivot means pivotably connecting the second end of the connection link with the rear end portion 10A, i.e. the shaft 54.

In the embodiment having the above-mentioned construction, when the position of the inboard end of the lateral link 60, i.e. the position of the joint 56, is maintained at a constant position relative to the vehicle body 20, the lower arm 16 cooperates with the connection link 36 to operate in the same manner as an H-type arm, with the lower arm 16 being pivotably connected by the joints 24 and 26 with the vehicle body 20 at the two inboard ends thereof spaced from one another in a longitudinal as well as lateral direction of the vehicle, while the lateral link pivotably connected with the vehicle body 20 at the inboard end thereof by the joint 56 operates to support the combination of the lower arm 18 and the connection link 36, so that a longitudinal force acting at the vehicle wheel 12 is supported directly by the lower arm 16 in a transverse direction as well as by the lateral link 60 indirectly by way of a turning moment transmitted through the carrier 10. Since the bifurcated outboard end construction provided by the outboard end of the A-type lower arm 16 and the expansible/contractible connection link 36 connected therewith to be pivotable about the axis 40 has a substantial rigidity against a torsional force applied thereto, the combination of the A-type arm 16 and the connection link 36 provides a stable suspension for the carrier 10 in the same manner as an H-type arm, with the lateral support provided by the lateral link 60 against the flexibility of the bifurcated outboard end construction in the steering direction.

Figure 4:
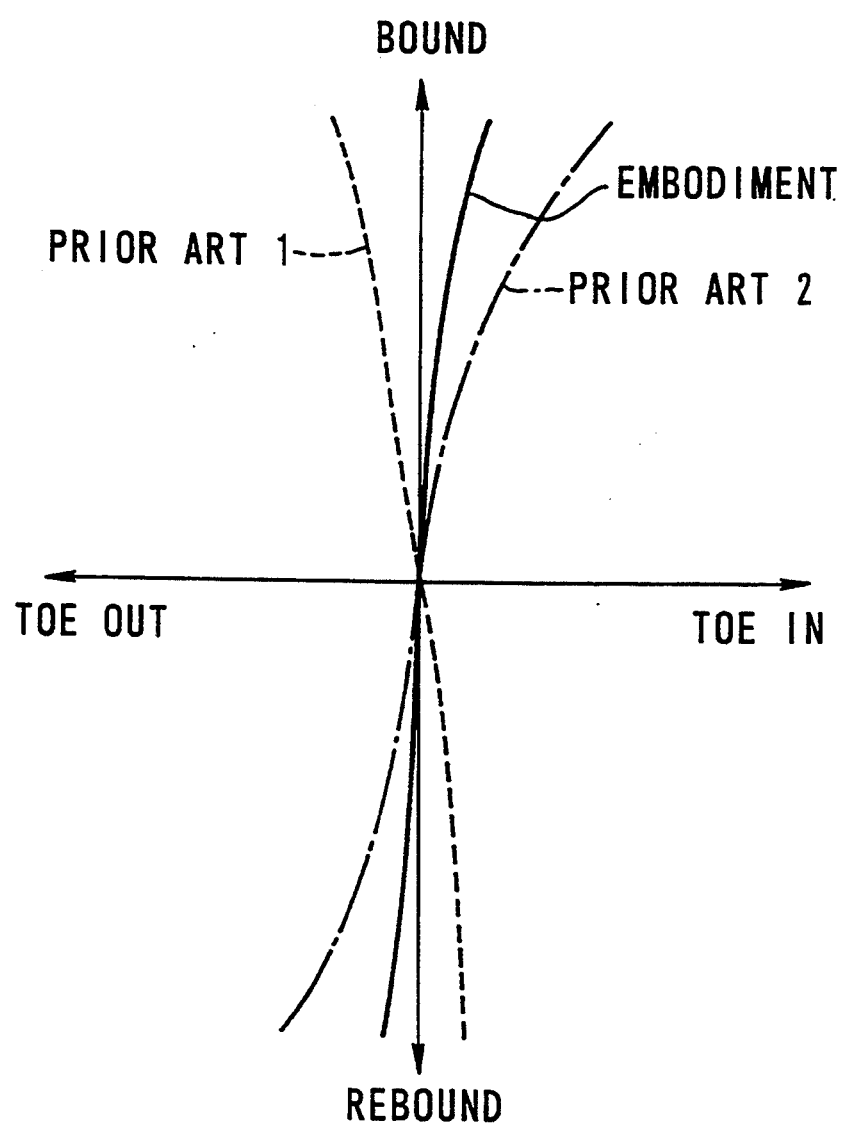
FIG. 4 is a graph showing the toe change performance of the embodiment shown in FIGS. 1-3 in comparison with the conventional double wishbone type suspensions.

In a conventional double wishbone type suspension having a simple H-type arm such as shown in FIG. 5 (referred to as prior art 1) and a conventional common double wishbone type suspension having an A-type upper arm and an A-type lower arm (referred to as prior art 2), the toe of the vehicle wheel changes according to the bound and rebound of the vehicle wheel as shown by a broken line curve and a dot and dash line curve in FIG. 4, respectively.

Particularly in the prior art 1, in order to obtain a required toe change performance during a normal bounding and rebound of the vehicle wheel, it is required that the axis 28 is arranged to be as more closely parallel to the axis 34 as possible. In this case, however, there occur an excessive toeing in and an excessive toeing out in a high bounding and a high rebounding region where an interference between the link elements occurs due to a restriction with regard to the arrangement and the length of the upper and lower arms. Although it is geometrically possible to completely cancel the toe change due to the bounding and rebounding of the vehicle wheel by arranging the axes 28 and 34 to extend horizontally and in parallel with the longitudinal direction of the vehicle. In this case, however, the instant center of the carrier 10 as viewed from the side of the vehicle is positioned infinitely distant, and therefore the well known performance of the suspension link of suppressing the floating up of the rear portion of the vehicle body during braking of the vehicle is lost, and further, during braking of the vehicle, a rearward directed braking force applied to the vehicle wheel turns the lower arm 16 rearward as viewed from the top of the vehicle, thereby causing an undesirable toeing out of the vehicle wheel.

In contrast, according to the shown embodiment of the present invention, the toe change toward the toeing out to occur in the suspension of the prior art 1 during the bounding of the vehicle wheel can be cancelled by the lateral link 60 disposed in parallel with the A-type lower arm 16 with its inboard end appropriately positioned relative to its outboard end, so that the toe change due to the bounding and rebounding of the vehicle wheel is modified to a desirable performance as shown by a solid line curve in FIG. 4.

Further, in the suspension of the prior art 1, when a rearward braking force is applied to the vehicle wheel during a braking of the vehicle, the front inboard end of the lower arm 16 shifts outward while the rear inboard end of the lower arm 16 shifts inboard due to an elastic deformation of the rubber bushings incorporated in the joints 24 and 26, so that the toeing of the vehicle wheel is shifted toward a toeing out direction.

In contrast, according to the shown embodiment of the present invention, if the lateral link 60 provided on the rear side of the ball joint 30 is arranged such that the joint 56 at the inboard end of the lateral link 60 is positioned rearward of the joint 58, the toeing of the vehicle wheel can be positively changed toward the toeing in direction according as the vehicle wheel is shifted rearward during a braking of the vehicle, improving the stability of the vehicle during a braking.

When the inboard end of the lateral link 60, i.e. the joint 56, is maintained at a constant position relative to the vehicle body 20, a change of the distance between the joint 38 and the joint 42 due to the turn of the lower arm 16 around the axis 28 due to a bounding or a rebounding of the vehicle wheel is absorbed by an expansion or a contraction of the connection link 36.

When, in the shown embodiment, the position of the inboard end of the lateral link 60, i.e. the joint 56, is moved in a lateral direction relative to the vehicle body 20 by an actuator such as a hydraulic cylinder means, the carrier 10 pivots about a king pin axis provided by an axis passing through the center of the ball joint 30 in parallel with the axis 40 passing through the center of the joint 38, to be steered forward or rearward relative to the lower arm 16 and the upper arm 14. Therefore, the shown embodiment can be applied to a suspension of a rear vehicle wheel of a vehicle in which four vehicle wheels are steered, with no substantial modification of the construction.

When the suspension of the above-mentioned prior art 2, i.e. a double wishbone type suspension in which the upper and lower arms are both A-type arms, is applied to a steering vehicle wheel, the king pin axis is provided by a straight line connecting the centers of the joints at the outboard ends of the upper and lower arms. In such a suspension, the ball joint of the upper arm on the carrier side is generally positioned on the inboard side of the ball joint of the lower arm on the carrier side, in order to obtain a desirable king pin inclination and a desirable king pin offset. In this case, however, since the inboard shifting of the two inboard ends of the upper arm for connection with the vehicle body is restricted according to the design of the vehicle body, the length of the upper arm must be sacrificed to be shorter than a desirable length.

In contrast, in the shown embodiment of the present invention, since the king pin axis is substantially a straight line passing through the center of the ball joint 30 at the outboard end of the lower arm to be in parallel with the axis 40 passing through the joint 38, the king pin axis can be optionally determined by the arrangement of the pivot joint 38 and the expansible/contractible link 36 such that a desirable king pin inclination and a desirable king pin offset are available without sacrificing the length of the upper arm. Although in the shown embodiment the axis 40 of the joint 38 of the connection link 36 on the side of the lower arm 16 is oriented to be substantially vertical and therefore substantially perpendicular to the direction of extension of the lower arm 16, the axis 40 may be inclined from such verticality or perpendicularity according to the requirements with respect to the king pin inclination, the king pin offset, etc. The position of the ball joint 30 at the outboard end of the lower arm 16 may also be appropriately shifted. Further, although in the shown embodiment the connection link 36 extends substantially in the longitudinal direction of the vehicle as viewed from the top of the vehicle, the arrangement of the connection link may be such that it looks as inclined relative to the longitudinal direction of the vehicle as viewed from the top of the vehicle.

According to the present invention, since the upper arm may be an I-type arm, a higher freedom is available with respect to the arrangement of the suspension spring and the shock absorber as compared with the case wherein the upper arm is an A-type arm. Further, since the share of the longitudinal force applied to the vehicle wheel which is to be borne by the upper arm is low, the supporting structure of the vehicle body for the inboard end of the upper arm can be relatively simplified.

Although the present invention has been described in detail with respect to a particular embodiment thereof, it will be apparent for those skilled in the art that various modifications are possible with respect to the shown embodiment without departing from the spirit of the present invention.

I claim:

1. A double wishbone type suspension comprising a carrier for supporting a vehicle wheel to be rotatable about an axis of rotation, an upper arm extending substantially in a lateral direction of a vehicle to have an inboard end pivotably connected with a body of the vehicle and an outboard end pivotably connected with a first portion of said carrier, a lower arm having at least two inboard ends spaced apart from one another in a longitudinal direction of the vehicle and pivotably connected with the body of the vehicle and an outboard end pivotably connected with a second portion of said carrier, a longitudinally expansible and contractible connection link having a first end connected with a portion of said lower arm substantially distant from said outboard end thereof to be pivotable relative thereto about a substantially vertical axis and a second end opposite to said first end pivotably connected with a third portion of said carrier substantially distant from said second portion thereof, and a lateral link having an inboard end pivotably connected with the body of the vehicle and an outboard end pivotably connected with one of a forth fourth a portion of said carrier substantially distant from said second portion thereof in at least the longitudinal direction of the vehicle and said second end of said connection link.

2. A double wishbone type suspension according to claim 1, wherein said third portion and said fourth portion of said carrier coincide with one another such that said second end of said connection link and said outboard end of said lateral link are pivotably connected with said carrier by a common pivot shaft.

3. A double wishbone type suspension according to claim 2, wherein said carrier has an arm portion extending rearward from a principal body thereof to provide said third and forth fourth portion thereof, said common pivot shaft is mounted at a free end portion of said arm portion providing said third and forth fourth portion so as to penetrate therethrough with opposite ends thereof projecting on opposite sides of said arm portion, and said second end of said connection link and said outboard end of said lateral link are pivotably mounted to said oppositely projected portions of said common pivot shaft, respectively.

4. A double wishbone type suspension according to claim 3, wherein a first one of said projected ends of said pivot shaft is formed with a ball portion, and said second end of said connection link has a socket portion for receiving said ball portion to construct a ball joint therewith.

5. A double wishbone type suspension according to claim 4, wherein a semi-ball element is mounted on a second one of said projected ends of said pivot shaft opposite to said first end, and said outboard end of said lateral link has a socket portion for receiving said semi-ball element to construct a ball joint therewith.

6. A double wishbone type suspension according to claim 1, wherein said connection link comprises an inner pipe element and an outer pipe element telescoped with one another.

7. A double wishbone type suspension according to claim 1, wherein said portion of said lower arm at which said first end of said connection link is pivotably connected is formed with a pair brackets, and said first end of said connection link is mounted between said pair of brackets by a shaft element supported at opposite ends thereof by said pair of brackets.

8. A double wishbone type suspension according to claim 3, wherein said portion of said lower arm at which said first end of said connection link is pivotably connected is substantially displaced inboard from said outboard end thereof pivotably connected with said second portion of said carrier, and said arm portion of said carrier extends rearward as well as inboard from said principal body toward said free end thereof providing said third portion of said carrier.

9. A double wishbone type suspension according to claim 8, wherein said connection link is disposed substantially along a longitudinal direction of the vehicle from said first end thereof pivotably connected with said lower arm to said second end thereof pivotably connected with said carrier as viewed from the top of the vehicle.

* * * * *